US008302012B2

(12) United States Patent
Schmitt

(10) Patent No.: US 8,302,012 B2
(45) Date of Patent: Oct. 30, 2012

(54) PROVIDING STATUS OF PORTAL CONTENT

(75) Inventor: Bernd Schmitt, Bruchsal (DE)

(73) Assignee: SAP Aktiengesellschaft, Walldorf (DE)

( * ) Notice: Subject to any disclaimer, the term of this patent is extended or adjusted under 35 U.S.C. 154(b) by 867 days.

(21) Appl. No.: 10/307,893

(22) Filed: Dec. 2, 2002

(65) Prior Publication Data

US 2004/0104947 A1 Jun. 3, 2004

(51) Int. Cl.
G06F 3/00 (2006.01)
(52) U.S. Cl. ........ 715/742; 715/234; 715/765; 715/772; 715/810
(58) Field of Classification Search .................. 715/742, 715/764, 765, 772, 810, 821, 856, 859, 513
See application file for complete search history.

(56) References Cited

U.S. PATENT DOCUMENTS

| | | | |
|---|---|---|---|
| 4,974,173 A | 11/1990 | Stefik et al. | |
| 5,644,334 A * | 7/1997 | Jones et al. | 345/419 |
| 5,760,771 A | 6/1998 | Blonder et al. | |
| 5,848,424 A | 12/1998 | Scheinkman et al. | |
| 5,893,110 A | 4/1999 | Weber et al. | |
| 5,978,828 A | 11/1999 | Greer et al. | |
| 5,995,943 A | 11/1999 | Bull et al. | |
| 6,023,708 A | 2/2000 | Mendez et al. | |
| 6,064,980 A | 5/2000 | Jacobi et al. | |
| 6,081,263 A | 6/2000 | LeGall et al. | |
| 6,085,229 A | 7/2000 | Newman et al. | |
| 6,154,764 A | 11/2000 | Nitta et al. | |
| 6,209,100 B1 | 3/2001 | Robertson et al. | |
| 6,263,363 B1 | 7/2001 | Rosenblatt et al. | |
| 6,266,649 B1 | 7/2001 | Linden et al. | |
| 6,300,947 B1 | 10/2001 | Kanevsky | |
| 6,311,194 B1 | 10/2001 | Sheth et al. | |
| 6,317,722 B1 | 11/2001 | Jacobi et al. | |
| 6,327,628 B1 * | 12/2001 | Anuff et al. | 719/311 |
| 6,330,007 B1 * | 12/2001 | Isreal et al. | 715/762 |
| 6,337,699 B1 * | 1/2002 | Nielsen | 715/837 |

(Continued)

FOREIGN PATENT DOCUMENTS

EP 1 143 679 A2 10/2001

(Continued)

OTHER PUBLICATIONS

Wikipedia, Thin client, Mar. 8, 2002, http://en.wikipedia.org/w/index.php?title=Thin_client&oldid=51480&printable=yes.*

(Continued)

Primary Examiner — Alvin Tan
(74) Attorney, Agent, or Firm — Fish & Richardson P.C.

(57) ABSTRACT

Methods and apparatus, including computer-program products, for providing a portal-based desktop. A computer-implemented method for providing status of portal content includes identifying at least one element of portal content to which a user is subscribed. The method includes monitoring a state of the one element of portal content. The method includes indicating status of the one element of portal content, the indication being included as portal content. A computer program product, for providing status of portal content, includes instructions operable to cause a processor to identify at least one element of portal content to which a user is subscribed. The product includes instructions to monitor a state of the one element of portal content. The product includes instructions to indicate status of the one element of portal content, the indication being included as portal content. The product is tangibly stored on machine-readable medium.

30 Claims, 5 Drawing Sheets

U.S. PATENT DOCUMENTS

| | | | |
|---|---|---|---|
| 6,356,899 B1 | 3/2002 | Chakrabarti et al. | |
| 6,356,922 B1 | 3/2002 | Schilit et al. | |
| 6,430,567 B2 | 8/2002 | Burridge | |
| 6,433,795 B1 | 8/2002 | MacNaughton et al. | |
| 6,452,609 B1 | 9/2002 | Katinsky et al. | |
| 6,460,038 B1* | 10/2002 | Khan et al. | 707/10 |
| 6,473,407 B1 | 10/2002 | Franklin et al. | |
| 6,516,349 B1* | 2/2003 | Lieberman | 709/225 |
| 6,553,412 B1 | 4/2003 | Kloba et al. | |
| 6,631,411 B1* | 10/2003 | Welter et al. | 709/224 |
| 6,643,661 B2* | 11/2003 | Polizzi et al. | 707/100 |
| 6,651,066 B2 | 11/2003 | Baxter et al. | |
| 6,675,350 B1 | 1/2004 | Abrams et al. | |
| 6,738,804 B1 | 5/2004 | Lo | |
| 6,741,853 B1 | 5/2004 | Jiang et al. | |
| 6,766,362 B1 | 7/2004 | Miyasaka et al. | |
| 6,816,720 B2* | 11/2004 | Hussain et al. | 455/404.2 |
| 6,850,252 B1 | 2/2005 | Hoffberg | |
| 6,877,134 B1 | 4/2005 | Fuller et al. | |
| 6,901,429 B2 | 5/2005 | Dowling | |
| 6,917,373 B2* | 7/2005 | Vong et al. | 715/840 |
| 6,918,090 B2 | 7/2005 | Hesmer et al. | |
| 6,947,959 B1 | 9/2005 | Gill | |
| 6,950,991 B2 | 9/2005 | Bloomfield et al. | |
| 6,959,319 B1 | 10/2005 | Huang et al. | |
| 6,993,529 B1 | 1/2006 | Basko et al. | |
| 6,996,778 B2 | 2/2006 | Rajarajan et al. | |
| 7,003,528 B2 | 2/2006 | Dan et al. | |
| 7,028,264 B2* | 4/2006 | Santoro et al. | 715/765 |
| 7,039,684 B2 | 5/2006 | Blockton et al. | |
| 7,103,844 B2 | 9/2006 | Jones et al. | |
| 7,162,504 B2 | 1/2007 | McCauley et al. | |
| 7,174,512 B2 | 2/2007 | Martin et al. | |
| 7,185,290 B2* | 2/2007 | Cadiz et al. | 715/838 |
| 7,269,664 B2 | 9/2007 | Huetsch et al. | |
| 7,305,679 B2 | 12/2007 | Kovacs et al. | |
| 7,346,668 B2* | 3/2008 | Willis | 709/219 |
| 7,376,907 B2* | 5/2008 | Santoro et al. | 715/765 |
| 7,404,141 B1 | 7/2008 | Giljum et al. | |
| 7,412,658 B2 | 8/2008 | Gilboa | |
| 7,496,839 B2 | 2/2009 | Duxbury | |
| 7,765,556 B2 | 7/2010 | Hauser et al. | |
| 8,028,237 B2 | 9/2011 | Schmitt | |
| 2001/0013050 A1* | 8/2001 | Shah | 709/202 |
| 2001/0049651 A1* | 12/2001 | Selleck | 705/37 |
| 2002/0004402 A1 | 1/2002 | Suzuki | |
| 2002/0019881 A1* | 2/2002 | Bokhari et al. | 709/246 |
| 2002/0042747 A1* | 4/2002 | Istvan | 705/26 |
| 2002/0049727 A1 | 4/2002 | Rothkopf | |
| 2002/0049833 A1 | 4/2002 | Kikinis | |
| 2002/0053078 A1 | 5/2002 | Holtz et al. | |
| 2002/0067370 A1* | 6/2002 | Forney et al. | 345/742 |
| 2002/0087679 A1 | 7/2002 | Pulley et al. | |
| 2002/0090932 A1* | 7/2002 | Bhatia et al. | 455/412 |
| 2002/0143659 A1 | 10/2002 | Keezer et al. | |
| 2002/0169852 A1 | 11/2002 | Schaeck | |
| 2002/0178223 A1 | 11/2002 | Bushkin | |
| 2002/0184055 A1* | 12/2002 | Naghavi et al. | 705/2 |
| 2002/0194267 A1 | 12/2002 | Flesner et al. | |
| 2003/0028896 A1 | 2/2003 | Swart et al. | |
| 2003/0084059 A1 | 5/2003 | Kelley et al. | |
| 2003/0093790 A1 | 5/2003 | Logan et al. | |
| 2003/0101412 A1* | 5/2003 | Eid | 715/513 |
| 2003/0126136 A1 | 7/2003 | Omoigui | |
| 2003/0182392 A1 | 9/2003 | Kramer | |
| 2003/0217061 A1 | 11/2003 | Agassi et al. | |
| 2003/0229900 A1 | 12/2003 | Reisman | |
| 2004/0003097 A1 | 1/2004 | Willis et al. | |
| 2004/0078476 A1 | 4/2004 | Razdow et al. | |
| 2004/0104931 A1 | 6/2004 | Schmitt | |
| 2004/0205473 A1 | 10/2004 | Fisher et al. | |
| 2004/0220926 A1 | 11/2004 | Lamkin et al. | |
| 2004/0230572 A1 | 11/2004 | Omoigui | |
| 2005/0193335 A1 | 9/2005 | Dorai et al. | |
| 2005/0204276 A1 | 9/2005 | Hosea et al. | |

FOREIGN PATENT DOCUMENTS

| | | |
|---|---|---|
| EP | 1 176 520 A2 | 1/2002 |
| EP | 1 367 513 A2 | 12/2003 |
| WO | WO 99/62011 | 12/1999 |
| WO | WO 00/65773 | 11/2000 |
| WO | WO 01/09737 A1 | 2/2001 |
| WO | WO 01/13287 A | 2/2001 |
| WO | WO 01/15050 A | 3/2001 |
| WO | WO 01/18688 A2 | 3/2001 |
| WO | WO 01/50289 A | 7/2001 |
| WO | WO 01/77903 A1 | 10/2001 |
| WO | WO 01/81829 A1 | 11/2001 |
| WO | WO2004/051507 | 6/2004 |
| WO | WO2004/051524 | 6/2004 |

OTHER PUBLICATIONS

Multimedia Home Platform, What is MHP, Apr. 28, 2001, http://web.archive.org/web/20010428011008/www.mhp.org/what_is_mhp/what_is_mhp.html.*

Amazon.com, "Recommendations," http://www.amazon.com/exec/obidos/tg/browse/-/508506/ref=br_bx_c_2_1/002-7851280-4410446, printed from the Internet Feb. 27, 2004, 2 pgs.

Amazon.com, "Why Was I Recommended This?" http://www.amazon.com/exec/obidos/tg/browse/-/764534/ref%3Dbr%5Fbx%5Fc%5F2%5F2/002-/002-7851280-4410446, printed from the Internet Feb. 27, 2004, 2 pgs.

Amazon.com, "Your Favorites," http://www.amazon.com/exec/obidos/tg/browse/-/560726/ref=br_bx_c_2_0/002-7851280-4410446, printed from the Internet Feb. 27, 2004, 2 pgs.

Bhatia, S. K., "Selection of Search Terms Based on User Profile," Proceedings of the 1992 ACM/SIGAPP Symposium on Applied Computing: Technological Challenges of the 1990's, Kansas City, MO, 1992, pp. 224-233.

Bulterman, D. C. A., et al., "GriNS: A Graphical Interface for Creating and Playing SMIL Documents," Computer Networks and ISDN Systems, North Holland Publishing, Amsterdam, NL, vol. 30, Nos. 1-7, pp. 519-529, XP004121396, 1998.

Google News (BETA), "A Novel Approach to News," http://news.google.com/help/about_news_search.html, printed from the Internet Oct. 1, 2002, 3 pgs.

Google News (BETA), "Top Stories," http://news.google.com, printed from the Internet Oct. 1, 2002, 5 pgs.

IBM, "IBM Websphere Portal Server Product Architecture V2.1," Nov. 19, 2001, pp. 1-31, XP002268018.

Kamba, T. et al., "The Krakatoa Chronicle—An Interactive, Personalized, Newspaper on the Web," Proceedings of the International Conference on World Wide Web, Dec. 11, 1995, pp. 1-12.

Li, Chung-Sheng, et al., "Multimedia Content Description in the Infopyramid," Acoustics, Speech and Signal Processing, Proceedings of the 1998 IEEE International Conference, May 12, 1998, pp. 3789-3792, XP010279595.

Netflix, "About Netflix," http://www.netflix.com/PressRoom?id=1005, printed from the Internet Jan. 5, 2004, 1 pg.

Netflix, "Fact Sheet," http://www.netflix.com/PressRoom?id=5206, printed from the Internet Jan. 5, 2004, 3 pgs.

Salembier, P. et al., "Description Schemes for Video Programs, Users and Devices," Signal Processing: Image Communication, Sep. 2000, vol. 16, pp. 211-234.

SAP Aktiengesellschaft, "mySAP Technology: Portal Infrastructure: People-Centric Collaboration," undated materials, copyright 2001, 28 pgs.

Seo, Y. W. et al., "Learning User's Preferences by Analyzing Web-Browsing Behaviors," Proceedings of the Fourth International Conference on Autonomous Agents, Barcelona, Spain, Jun. 3-7, 2000, pp. 381-387.

Sugiura, A. et al., "Internet Scrapbook: Automating Web Browsing Tasks by Demonstration," UIST '98, ACM Symposium on User Interface Software and Technology, San Francisco, CA, Nov. 1-4, 1998, pp. 9-18.

"What is My Yahoo!?," http://wizards.yahoo.com/members/tools/publishing/wizards/server/bottom-right/1, printed from the Internet Feb. 27, 2004, 7 pgs.

Galic et al., "Access integration pattern using IBM webSphere portal server," Nov. 2001, IBM Corp., First Edition, pp. 1-364.

Multimedia Home Platform, What is MHP, Apr. 28, 2001, http://web/archive.org/web/20010428011008/www.mhp.org/what_is_mhp/what_is_mhp.html.

Wikipedia, Thin client, Mar. 8, 2002, http://en.wikipedia.org/w/index.php?title-Thin_client&oldid=51480&printable=yes.

The International Search report mailed Nov. 5, 2004 for International Application No. PCT/EP03/13589, filed Feb. 12, 2003.

Response to the European Patent Office from Mueller-Bore & Partner dated Apr. 13, 2006.

Office action from U.S. Appl. No. 10/307,903, dated Feb. 13, 2006, 14 pages; Response to office action, filed Jun. 1, 2006, 18 pages.

Final office action from U.S. Appl. No. 10/307,903, dated Aug. 8, 2006, 17 pages; Response to final office action, filed Nov. 7, 2006, 16 pages; Advisory action dated Dec. 7, 2006, 3 pages; RCE filed Jan. 8, 2007, 1 page.

Office action from U.S. Appl. No. 10/307,903, dated Apr. 12, 2007, 16 pages; Response to office action, filed Jul. 12, 2007, 13 pages.

Final office action from U.S. Appl. No. 10/307,903, dated Sep. 26, 2007, 16 pages; RCE and response filed Oct. 29, 2007, 15 pages.

Office action from U.S. Appl. No. 10/307,903, dated Jan. 15, 2008, 17 pages; Response to office action, filed Apr. 15, 2008, 13 pages.

Final office action from U.S. Appl. No. 10/307,903, dated Jul. 16, 2008, 18 pages; Response to final office action, filed Sep. 16, 2008, 14 pages; Advisory action, dated Oct. 6, 2008, 3 pages; RCE filed Oct. 20, 2008, 1 page.

Office action from U.S. Appl. No. 10/307,903, dated Jan. 7, 2009, 17 pages; Response to office action, filed Apr. 6, 2009, 17 pages.

Final office action from U.S. Appl. No. 10/307,903, dated Jun. 24, 2009, 17 pages; Response to final office action, filed Aug. 24, 2009, 17 pages.

Action and Response History in U.S. Appl. No. 10/307,903.

International Search Report in Application No. PCT/EP03/13588, dated Jun. 2, 2004.

* cited by examiner

FIG_4

PROVIDING STATUS OF PORTAL CONTENT

BACKGROUND

The present disclosure relates to data processing, and more particularly to portals.

Generally, a portal refers to a single entry point through which a user can access information, applications, and services needed to perform one or more tasks. Computer programs that generate portals, or simply portal software, typically reside on a server of a network such as, for example, the Internet. Portal software is usually accessed from a client computer.

A portal can include, for example, content such as data, applications and transactional systems, and Web content and services. The data can be structured or unstructured. The portal content is generally included in the portal by subscription. That is, the user subscribes to the content that the user wants to be included in the portal. Portal software, thus, can provide different portal content to different users. Furthermore, portal software can provide the same portal content to a particular user, regardless of where in the network the user accesses the portal software. The user will, thus, have the same portal content even when the user launches the portal from different client computers.

Portal content can be distributed. That is, portal content can be located on different points of the network. A portal can, for example, provide access to a first application and a second application even when the first and second applications are located on different servers. A portal, can also, for example, provide access to a first set of data and a second set of data even when the first and second sets of data are stored at different locations in the network.

Access is typically page-oriented. A user operating a client computer, for example, can use a browser to access the portal. In this case, the client and the server can communicate by using hypertext transfer protocol ("HTTP").

Access can be stateless. That is, the portal software and the portal content can have no access to information that describes interactions of a previous user session. Alternatively, access can be stateful, which can be implemented, for example, by rewriting URLs, using sessions cookies, or using unique session identifications. In general, a particular set of communications between a server and a client will be referred to in this specification as a user session. The set can be defined in different ways. A user session, for example, can be identified based on when a browser being used is opened and closed. A user session can also be identified by the network application itself. For example, a network application can include a login and logout function that starts and terminates, respectively, a user session.

SUMMARY

The disclosure describes methods and apparatus, including computer-program products, for providing a portal-based desktop.

In general, in one aspect, a computer-implemented method for providing status of portal content includes identifying at least one element of portal content to which a user is subscribed. The method includes monitoring a state of the one element of portal content. The method includes indicating status of the one element of portal content, the indication being included as portal content.

In general, in another aspect, a computer program product, for providing status of portal content, includes instructions operable to cause a processor to identify at least one element of portal content to which a user is subscribed. The product includes instructions to monitor a state of the one element of portal content. The product includes instructions to indicate status of the one element of portal content, the indication being included as portal content. The product is tangibly stored on machine-readable medium.

Various implementations of the disclosure may realize one or any combination of the following advantages. A portal as described in this specification provides a desktop computing environment in which content can be organized by context. The desktop computing environment, or simply desktop, is an aspect of a user interface through which data can be organized. The desktop can be said to provide a virtual replica of one's physical desktop. Context, as used in this specification, refers, but is not limited, to a subject matter of interest to a user. The portal can be organized by context, for example, into one work area for work, another work area for personal use, and a third work area for a particular project. Furthermore, the portal can be organized into different levels of context. That is, within one work area having one context, content can be further organized by more specific contexts. For example, the work area for personal use can include further work areas such as those for, for example, entertainment, email, and car insurance. Work areas can be implemented as one or more configurable workspaces. Each workspace can include content related to a context. Each work space can include one or more configurable folders. Each folder of a work space can include content that are related to a context that is more specific than the context of the parent work space. The work space can provide an overview of the content of the folders in the workspace. Navigating into a folder can provide a detailed view of the folder content. In one implementation, the portal includes a navigation window in each work space for navigating the portal's workspaces and folders.

Portal content can include applications or data as specified by the user. The portal can include content from heterogeneous systems rather than include only links to the content. Access to the portal can be established without using a virtual private network. That is, a user can generally use any client computer that has Internet access to launch the portal. The portal reduces the need for installation of applications on client computers. The client computers from where a portal is launched can be a thin client computer. That is, the client computer can operate with a reduced operating system ("OS") and without customized applications to allow a user access to a desktop like environment. In some implementations, only a browser is required to gain access to the desktop computing environment. The portal can be configured to operate in conjunction with applications that are local at the client computer. Alternatively, the portal can be configured to operate independently of the local applications. The portal can generally be launched from any client regardless of the client's particular OS. That is, the portal is OS independent. The portal can also be launched using any browser and, hence, is browser independent.

The portal can provide status of the portal's content. In some implementations, a user can be notified of a change in state of a portal application, even when the application is not being displayed on the portal. In some implementations, a portal status bar can be used to replace a locally generated desktop status bar.

The portal can facilitate data backup by unifying the distributed data in a centralized location. In certain implementations, the portal software can provide a user with a portal display that includes a layer of abstraction of data to identify key data for the user. The abstraction layer can also have the capability of responding at a user's level of authority, preferred profile, and requirements to fulfill a function or a user's request.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Overview

Figure 1:
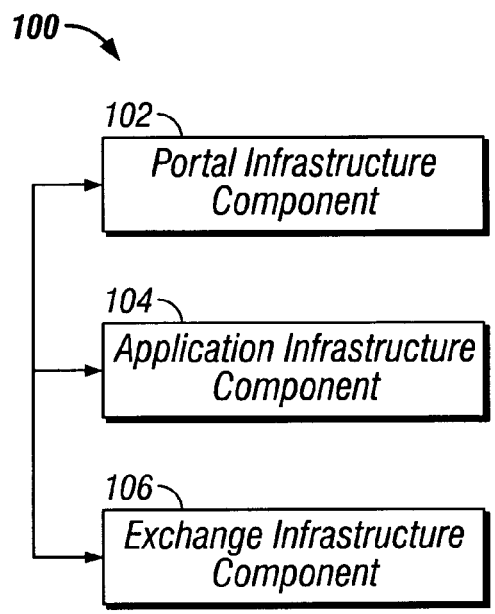
FIG. 1 shows a block diagram of a portal system.

FIG. 1 shows a portal system 100. The system includes a component 102 that provides the portal infrastructure, a component 104 that provides an application infrastructure (e.g., a Web application infrastructure), and a component 106 that provides an exchange infrastructure.

The portal infrastructure facilitates user-or people-centric collaboration. The portal infrastructure component 102 can be implemented as a single computing device or multiple computing devices. The portal infrastructure component 102 includes portal software that provides the portal framework. As discussed, the portal content can be customized by subscribing to content and organized according to user input. The component 102 can store information that indicate the content subscriptions and organization for a user. Portal software can include computer programs that monitor the status of the portal content and push status information to a client.

The application infrastructure component 104 provides the infrastructure on which applications and services distributed throughout a network can run. The application infrastructure component 104 can include one or more servers of the network or can be implemented as a single server, such as, for example, a Web application server. The applications can included proprietary applications of different vendors, such as the R/3 applications available from SAP AG of Walldorf, Germany.

The exchange infrastructure component 106 provides an exchange infrastructure, which provides process centric collaboration. The exchange infrastructure component 106 can include one or more computing devices and serves to synchronize data between applications. For example, the exchange infrastructure component 106 can take data from a customer order application (e.g., Bob Smith, order of 5 computers, date X, price $Z), transform it into compatible formats, and push it into a customer relationship management ("CRM") application (e.g., Bob Smith, order placed on date X, order expected to ship on date Y, etc.), as well as a bookkeeping application (e.g., accounts receivable entry of $Z from Bob Smith).

Figure 2:
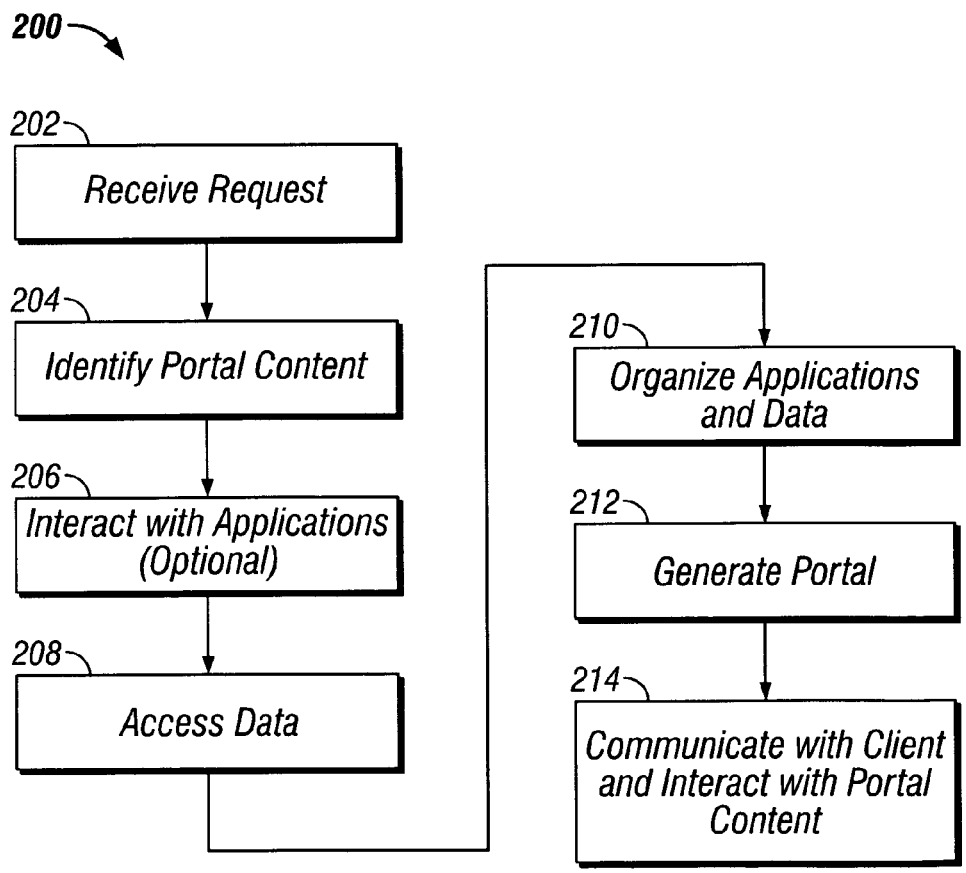
FIG. 2 shows a method for providing a portal-based desktop in a computing environment.

FIG. 2 shows a method 200 for providing a portal-based desktop in a computing environment. A system performing method 200 receives a request from a client computer (step 202). The request specifies a user and indicates that the user wants to launch a portal. The client computer can be a personal computer, personal digital assistant, or other computing devices, including those that use wireless or wired communication protocols to access the portal software. The system identifies the portal content to which the user has subscribed (step 204). The content can include one or more applications and data. The applications and data can be distributed at different locations in a network. The system optionally interacts with the applications (step 206). The system can launch an application when appropriate, e.g., when a user has specified that the application is to be executed when the portal is launched, and provide a user interface for the application. The system accesses the data (step 208) and organizes the one or more applications and the data (step 210). The system can be organized in accordance to user input and subscription. The organization can be implemented as one or more workspaces, each workspace including one or more folders. In one implementation, each workspace is reserved for a specific task. The folders in each workspace include interfaces, such as iViews, for applications that are relevant to the task. An iView, or Integrated View, is generally a self-contained presentation element. An iView is essentially a small application or a window within the portal page that displays the content from a particular source (e.g., an application, a database, or a Web page). iViews can either present information directly as it would appear in the source, or reformatted in XML so as to create a consistent look and feel across the portal. The system generates the portal (step 212). The portal implements the organization defined in step 210. The system communicates with the client and interacts with the portal content in response to the client interactions (step 214). The system can communicate by receiving and sending messages, such as, for example, HTTP requests and responses. The messages can include content expressed in hypertext markup language ("HTML"), extensible markup language ("XML"), or any other markup languages.

Desktop Function in a Portal

In one implementation, a portal desktop may be used to replace a user's locally generated (i.e., client-side) desktop. The portal desktop can be stored on a server that is accessible to a client. The portal desktop can be organized into folders containing either or both team or personal data. The folders of the portal desktop can also include iViews that provide access to heterogeneous data related with the folder, such as a project folder for data related to an area of work. Workspaces of the portal desktop provide access to the folders. Workspaces represent different views on a portal desktop display. Each workspace can be implemented as a Web page. The portal desktop can also include a status/notification bar, which is further described below.

Functionality may be provided in the portal desktop. A user may be provided with access to different data and applications at the portal, workspace, or folder level. For example, a user can access email from both the workspace and project folder levels. As another example, a project task plan may be accessed by user selection at the project level.

As discussed, portal content can be organized by context. Furthermore, portals can include one or more presentation components. Generally, a presentation component can be represented by a page of the portal. When the portal is Web based, the portal page can be a Web page. A portal, thus, can include presentation components that include one or more elements of portal content. A presentation component can, for example, include multiple applications and data with which to execute the applications. In one implementation, portal content that are related to a certain task can be grouped into a workspace for the task. In this case, the portal content are grouped together and represented in a single portal page, or when the portal is Web based, a single Web page. The portal content of a portal page can be further grouped. In one implementation, a workspace includes one or more folders that represent categories within a workspace. The folders can represent different areas of interests, serve different functions, and so forth. One folder can, for example, serve as a tool to schedule appointments. This folder can include portal content such as, for example, a project calendar, emails, contact information, and so forth. Another folder can, for example, serve as a project development tool. This second folder can include portal content such as, for example, a project development application and data objects that relates to project development.

Workspaces can offer various content management features to help users find and use the information. In a particular feature, the portal may allow users to plan, find, filter, create and distribute information from multiple information sources and to various audiences depending upon the user's role as described herein. Classification capabilities may automate the arrangement of information and provide access by subject area. Information may be published to users, and users can subscribe to automatically receive content. The user can create personal or team project folders within the workspace, and the user may select and enter a project folder.

Figure 3:
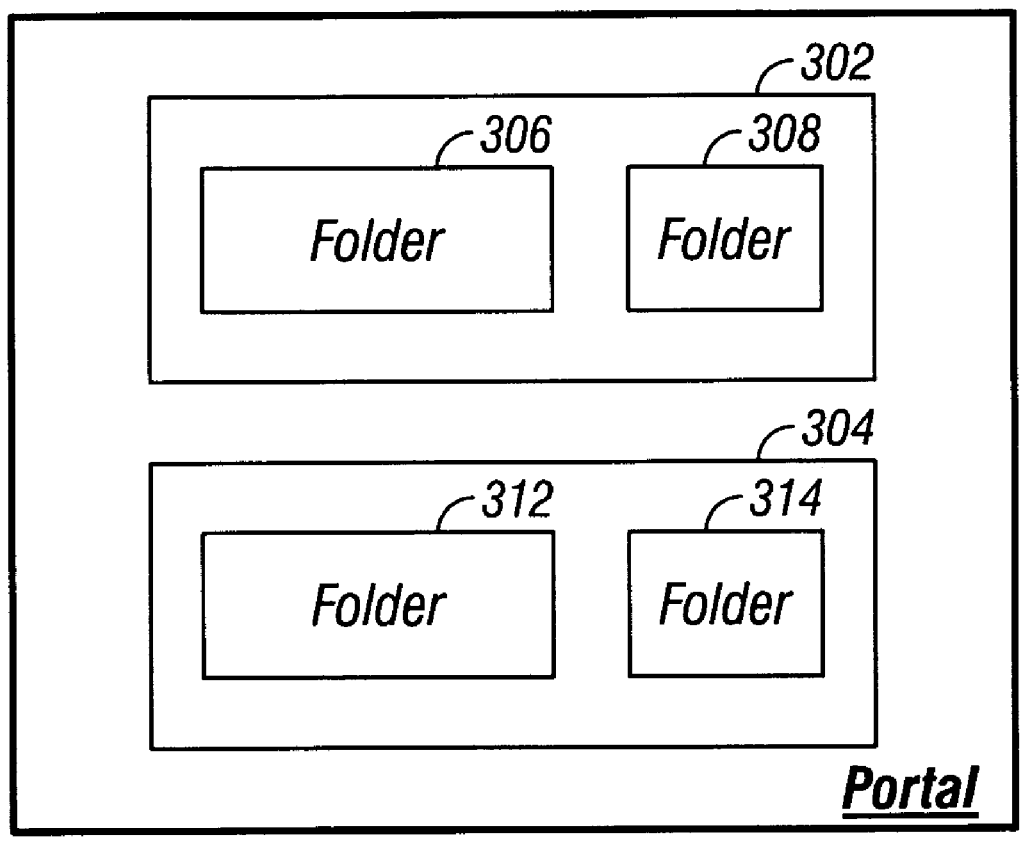
FIG. 3 shows an example organization of portal content.

FIG. 3 shows an example organization of portal content. In the example, the portal content are organized into two work spaces, workspace 302 that includes work related content and workspace 304 that includes content for personal use. The workspace 302 includes folders 306 and 308. The folder 306 includes content related to work correspondences. The content of the folder 306 can include, for example, an email application, email messages that are work related, a text editor, text documents that are work related, a presentation editor, and presentations that are work related (none shown). The folder 308 includes content that are related to a work related project. The content of the folder 308 can include, for example, a project development application, project data, the text editor, text documents related to the project, the email application, and email messages that are related to the project (none shown). The workspace 304 includes folders 312 and 314. The folder 312 include content related to personal email. The content of the folder 312 includes the email application and personal email messages (neither shown). The folder 314 includes content that are for entertainment such as, for example, game, video, and music applications.

Figure 4:
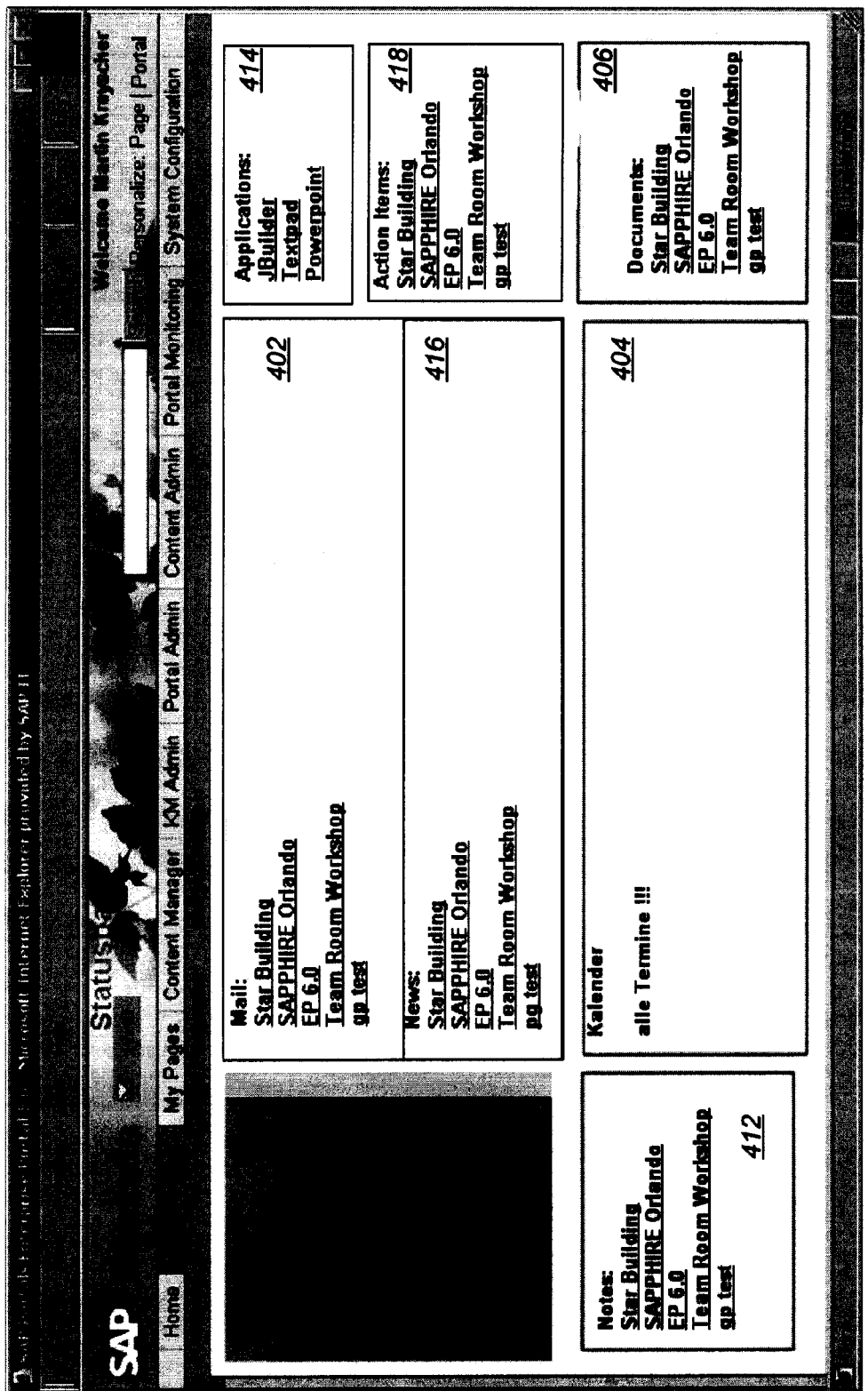
FIG. 4 shows an example workspace.

FIG. 4 shows an example workspace 400. The workspace 400 includes areas for email notification 402, team calendar 404 which may include events and appointments associated with a collaborative effort, documentation 406, status/notification status bar 408, portal navigation 410, team notes 412, applications 414, project related news 416, and action items 418. Other workspace functionality can be presented, including, by way of example, instant messages, names of team members, a personal calendar, discussions between team members and so on (not shown). As discussed above, the functions also may be implemented at different portal levels. For example, a team calendar may be implemented at the project level while a personal calendar may be implemented at the workspace level. That is, the team calendar may, in the instant case, be implemented in a project folder and the folder presented at the workspace level.

The status/notification bar 408, described below in further detail, can be used to inform the user of changes to underlying information sources, availability of applications, action items due, configuration of the portal such as date and time, or other portal environmental information.

Portal-clients or users can be provided content in the portal desktop according to their role. A user might have many roles in an organization. For example, the same user can have roles such as general employee, sales department employee, sales manager, and east coast employee. A user's role may help determine the work-sets that the user may use to complete tasks. Users may be defined by their roles and access to information determined by the roles. Roles may be specific to individuals, groups of individuals, internal and external users of the portal. Employees and external business partners can be assigned roles that are under control of the company. An administrator of a portal may provide a user with default work-sets that are associated with the user's roles. Features of the portal may allow the user to personalize or customize their work-sets content beyond those afforded by the default roles.

Figure 5:
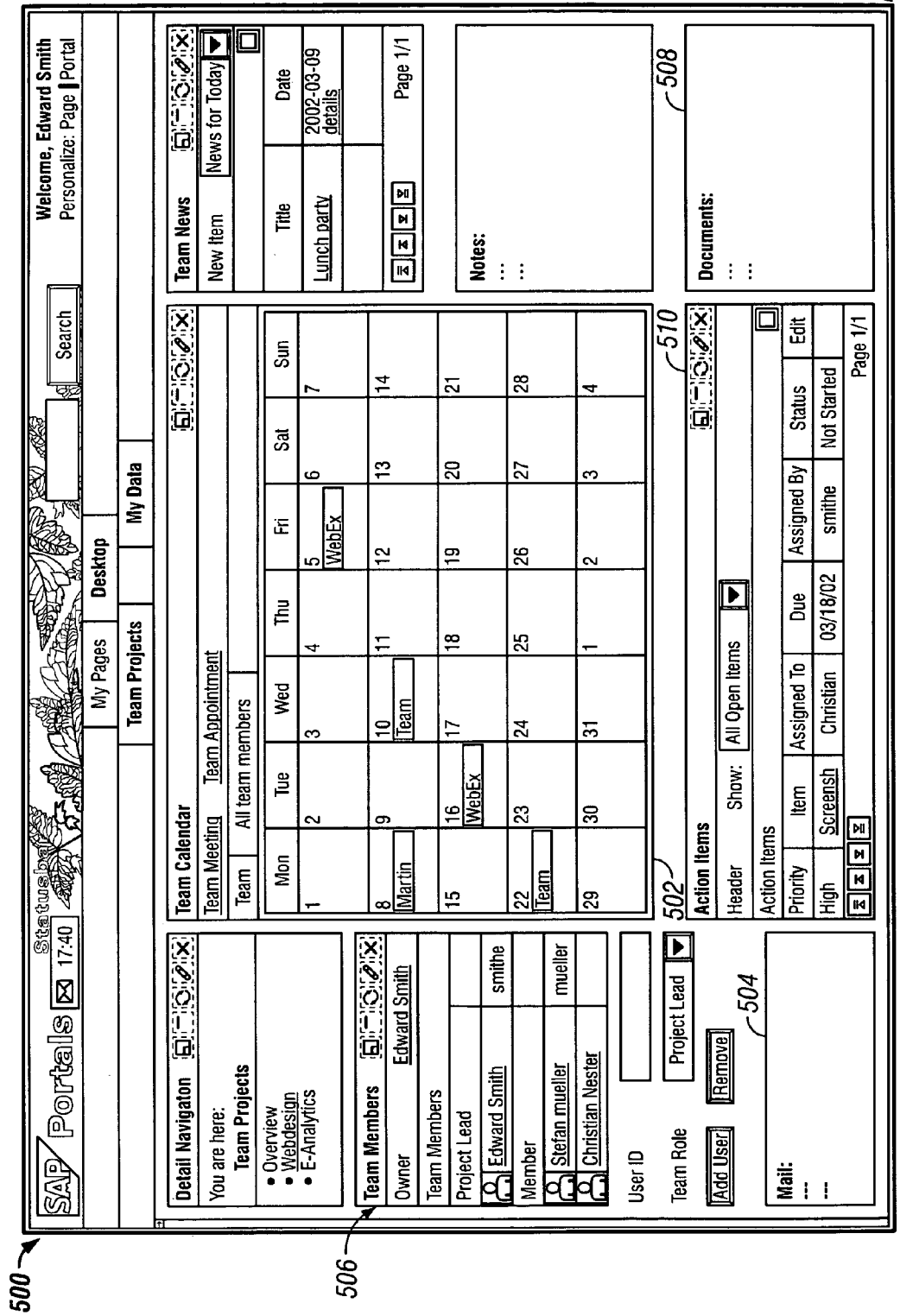
FIG. 5 shows an example project folder.

The portal-client also may organize the portal desktop display according to their own preferences. This personalization of the desktop enables users to configure the portal to meet their individual needs and interests. For example, users can configure the portal appearance. FIG. 5 shows an example project folder 500. In the illustrated case, the project folder 500 includes a team calendar 502. The team calendar 502 can include detailed information associated with a particular date. The project folder 500 can also include one or more views of heterogeneous information associated with the project folder, such as email 504, team member list 506, project documents 508, and action items 510. The status/notification bar, described below, can be configured to remain visible in the selected sub-page.

In one implementation, the portal-based desktop can be executed by a server and, hence, independent of the client-side operating system or Web browser. The portal desktop can be run without local installation of desktop software and may be used by clients with both a full OS or a reduced OS such as JAVA OS or, more specifically, Multimedia Home Platform ("MHP").

The project folders can be synchronized so that a user may work offline. With a client-side local desktop, for example, the folders can be synchronized with the local operating system, including the file system and desktop for local, offline, editing of documents. The local desktop can also be used to launch client-side applications to, for example, edit or create files on the local desktop.

The project folders also can be configured for working offline without using the local desktop or applications. In this instance, the applications may be started as browser plug-ins such as a PDF-viewer or office-viewer. Applications also may be started from connected network resources or downloaded from a Web-server and run on a local virtual machine such as the Java Virtual Machine ("VM") or .Net-VM.

Status/Notification Bar in a Portal

As discussed above, the portal can indicate content status. In one implementation, the indication is provided by a status/notification bar that is included in the portal. The bar indicates to a user the state of one or more pages that are represented in the portal. The display may be used to alert a user to the status, or change in status, of a portal page.

Figure 6:
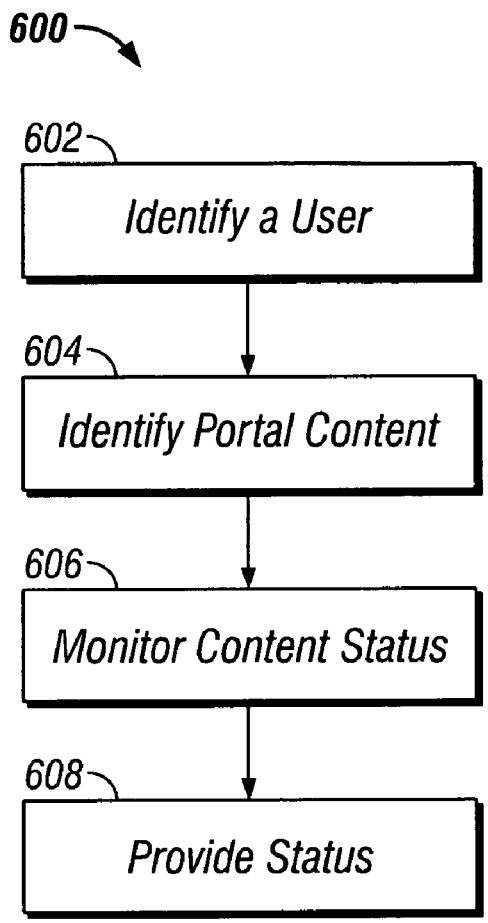
FIG. 6 shows a method for indicating portal content status.

FIG. 6 shows a method 600 for indicating portal content status. A system performing method 600 identifies a user (step 602) who has launched a portal as described above. The system can identify the user based on, for example, the user logon information. Alternatively, the system can identify the user through any commonly known methods, such as a network data-packet classification.

The system identifies the portal content to which the user has subscribed (step 604). As discussed above, the content can include applications and data, both of which can be distributed throughout a network.

The system monitors the content status (step 606). Monitoring content status includes, for example, monitoring the states of content and alerts, such as prompts for when the content requires user input and when the content is outputting information. In one implementation, monitoring is performed by an application that is located on a Web application server. The application uses the described exchange infrastructure to interact with the content to which the user has subscribed. Alternatively, the monitoring can be performed by others, such as intelligence included in the portal infrastructure.

In one implementation, the system determines an initial state of each application to which the user has subscribed and monitors for changes in the state of the applications. Based on the state of each application, the portal software can select a status indicator that is representative of the state of the application. Different states can be represented by different status indicators. An appointment application, for example, can have a first state for when there are no alerts and a second state when there are alerts. A first status indicator, such as a non-flashing icon, can indicate that the appointment application is running. A second status indicator, such as a flashing icon or a pop-up icon, can indicate that the appointment is running and that there are one or more alerts.

The initial state can be referenced to the last time the user accessed the portal. For example, if there has been an alert since the last user session, the portal software selects and displays a status indicator to notify the user that there has been an alert since the last user session.

The portal software monitors the subscribed content for a change in state. If there is no change in state, the portal software may continue to display the same status indicator to the user. If a change in state of the subscribed content is detected, the portal software may replace the displayed status indicator with a different status indicator representative of the changed state of the subscribed content.

The system provides status (step 608). Providing status includes providing status notifications as portal content. Providing status can also include a status bar as portal content. The status bar can include, for example, icons that represent the content to which the user has subscribed. The icons can have different states that indicate status.

Optionally, the system can configure the status indication in accordance to user input. For example, the system can indicate status by changing size of the icons, appearance of the icons, and color of the icons.

Figure 7:
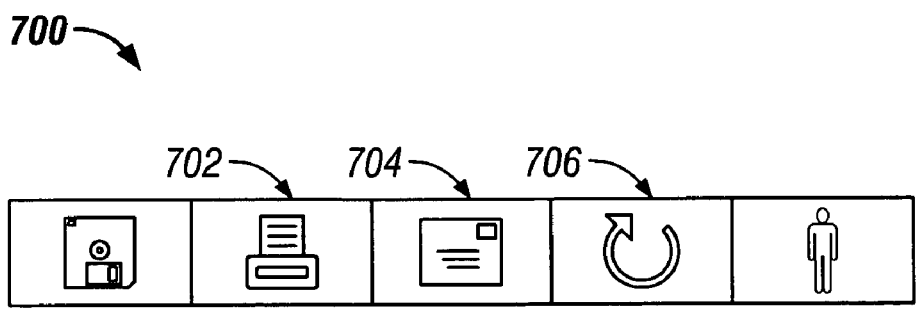
FIG. 7 shows an example status/notification bar.

FIG. 7 shows an example status/notification bar 700 that can be displayed as portal content. The status bar can be assigned to a user at a highest portal level to indicate status of all portal content. The status bar can indicate content, even if the content is not being displayed.

The status bar can include notification symbols 702, 704, and 706 representing applications or information to which the user is subscribed. The symbols may be arranged in any desired format and is shown in a bar for illustration purposes only. The status indicators may be icons, text, or other display item.

The symbols can correspond to user subscribed applications and information as well general portal settings such as setting a time, help, how to set an alarm, and so forth. The corresponding context of the symbol does not have to be displayed. For example, a symbol 704 may represent on-line meetings to which the user is subscribed. In this instance, the discussion taking place need not be displayed on the portal desktop or even available through the desktop. Similarly, a symbol 706 may represent orders filled on a project. The actual order listing need not be displayed on the portal desktop. The status bar/notification bar also may include symbols for notification of incoming mail, or an appointment in a calendar, a clock, and so forth.

The status/notification bar can be displayed on a portal page as illustrated in FIG. 4. The status/notification bar can be displayed in any space that is not erased when changing between portal pages and contexts.

The user may personalize the status/notification bar to display symbols associated with roles, work-sets or views to which the user is subscribed. The portal software may use a hierarchical search to locate notification items for the status/notification bar.

Each notification symbol can change to indicate that an event has occurred in a user subscribed portal content. The occurrence of an event, for example, in a user subscribed page can be passed to the status/notification bar for update to the user. In one implementation, status indication is based on the sending of events from one iView to another iView. In general, events are messages that specify a data object and some action associated with the data object. Events and eventing are further described in commonly owned U.S. application Ser. No. 10/137,208, filed on Apr. 30, 2002, which is hereby incorporated by reference in its entirety.

Status indicator 704, for example, can change appearance to indicate that an on-line meeting is in progress. Similarly, the symbol 706 can change color to indicate that a change has occurred in the portal information source containing the status of filled orders. For example, an additional order may have been entered or an order filled that was previously unfilled. In addition or instead of a status indicator change, the user also may be alerted to a notification item by using pop-up text, sound, or other alerting action.

A permanent refresh or other check mechanism can be used to check the status of portal content being monitored and refreshes the status bar display on the occurrence of a change in the portal content. Within a portal, users can be notified proactively or alerted to a change in relevant events. That is, the notification may be triggered by either pull from the front-end client-side or a push from the back-end side associated with the server. The displayed item may be selected by the user to trigger an action. For example, the user may select by clicking on the order status indicator 706a to open a window with the portal order status entries.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. For example, the method described herein can be combined into a single method and performed on a single system. The system can included any portal content and is not limited to including those examples described above. The portal content included also need not be only those subscribed by a user. The system can include portal content that are generic in nature and that can be generally useful to users. In one implementation, these generic portal content elements are implemented as a collection of iViews, also referred to a channel, that are not part of any workspace.

The iViews are those of general interests. The presentation components can be other than a Web page. The status indication need not be a status bar but, alternatively, can be any representation that indicates status. The status indication can be represented as sound, images, text, pup-up icons, or any combination of these. Accordingly, other embodiments are within the scope of the following claims.

What is claimed is:

1. A computer-implemented method for providing status of portal content in a portal session, comprising:
   identifying the portal content, the portal content comprising:
      one or more applications to which a user is subscribed, and
      portal settings, the portal settings comprising features that pertain to unsubscribable elements of the portal session that are related to a configuration of the portal session;
   monitoring one or more states of the one or more applications and the portal settings;
   providing, to a client device, access to a portal desktop for presenting the portal content comprising the one or more applications and the portal settings;
   providing a status indicator arrangement in the portal desktop, wherein a first portion of the status indicator arrangement represents states of the one or more applications and a second portion of the status indicator arrangement represents states of the portal settings;
   notifying the user of a change in a state of one or more of the one or more applications and notifying the user of a change in state of the portal settings using the status indicator arrangement,
      wherein notifying the user of the change in the state of the one or more of the one or more applications comprises notifying the user even if the one or more of the one or more applications are not being displayed to the user,
      wherein the status indicator arrangement comprises graphical representations corresponding to the one or more applications and the portal settings, and wherein initial states of the graphical representations are referenced to states of the graphical representations in a previous portal session,
      wherein notifying comprises changing an appearance of a predetermined graphical representation to indicate an occurrence of an event in the portal content corresponding to the predetermined graphical representation, wherein changing the appearance of the predetermined graphical representation occurs in accordance with user input, the user input specifying the changed appearance of the predetermined graphical representation, the event comprises messages that specify a data object of the portal content and an action associated with the data object, and
   in response to the user selecting the predetermined graphical representation in the status indicator arrangement, triggering an action related to portal content corresponding to the predetermined graphical representation.

2. The method of claim 1, wherein monitoring the one or more states comprises:
   determining a state of the one or more applications and the portal settings.

3. The method of claim 2, wherein changing the appearance of the predetermined graphical representation comprises:
   selecting the changed appearance of the predetermined graphical representation from a plurality of graphical representations, each of the plurality of graphical representations being associated with a respective state of the one or more applications; and
displaying the changed appearance of the predetermined graphical representation.

4. The method of claim 3, wherein monitoring the one or more states further comprises:
monitoring the one or more applications and the portal settings for a change of state;
replacing the predetermined graphical representation with an updated graphical representation associated with a detected change of state; and
iteratively monitoring and replacing, as required, the predetermined graphical representation with the updated graphical representation.

5. The method of claim 1, wherein changing the appearance of the predetermined graphical representation comprises:
outputting one of pop-up text, mouse-over text, and sound.

6. The method of claim 5, wherein:
providing a status indicator arrangement comprises displaying a status bar.

7. The method of claim 6, wherein displaying the status bar comprises providing the graphical representations to the portal desktop, the graphical representations comprising one of an icon, text, pop-up text, and sound.

8. The method of claim 1, wherein:
monitoring the one or more states comprises monitoring applications distributed over a network.

9. The method of claim 1, wherein the identified portal content comprises one of email, calendar functions, alerts, project development systems, and news.

10. The method of claim 1, further comprising:
identifying additional elements of portal content to which the user has subscribed;
monitoring statuses of the additional elements; and
providing additional graphical representations to indicate the statuses of the additional elements, the additional graphical representations being included as portal content.

11. The method of claim 1, wherein the one or more applications and the portal settings comprise a first element of portal content, the method further comprising:
identifying a second element of portal content based on a role of the user;
monitoring a status of the second element of portal content; and
providing a second, different graphical representation to indicate the status of the second element of portal content, the second graphical representation being included as portal content.

12. The method of claim 1 in which triggering an action related to portal content corresponding to the predetermined graphical representation comprises opening a new window with information related to the portal content corresponding to the predetermined graphical representation.

13. The method of claim 1 further comprising selecting a space on a first portal page for displaying the status indicator arrangement such that the space is not erased when the first portal page changes to a second, different portal page.

14. The method of claim 1 further comprising replacing a locally generated desktop on the client device with the portal desktop.

15. A computer program product, stored on a non-transitory machine-readable storage medium, for providing a status of portal content in a portal session, the product including instructions operable to cause a processor to:
identify the portal content, the portal content comprising:
one or more applications to which a user is subscribed, and
portal settings, the portal settings comprising features that pertain to unsubscribable elements of the portal session that are related to a configuration of the portal session;
monitor one or more states of the one or more applications and the portal settings;
provide, to a client device, access to a portal desktop for presenting the portal content including the one or more applications and the portal settings;
provide a status indicator arrangement in the portal desktop, wherein a first portion of the status indicator arrangement represents one or more states of the one or more applications and a second portion of the status indicator arrangement represents states of the portal settings, the status indicator arrangement being included in the portal content;
notify the user of a change in a state of one or more of the one of more applications and notifying the user of a change in a state of the portal settings using the status indicator arrangement,
wherein notifying the user of the change in the state of the one or more of the one or more applications comprises notifying the user even if the one or more of the one or more applications are not being displayed to the user,
wherein the status indicator arrangement comprises graphical representations corresponding to the one or more applications and the portal settings, and wherein initial states of the graphical representations are referenced to states of the graphical representations in a previous portal session,
wherein notifying comprises changing an appearance of a predetermined graphical representation to indicate an occurrence of an event in the portal content corresponding to the predetermined graphical representation, wherein changing the appearance of the predetermined graphical representation occurs in accordance with user input, the user input specifying the changed appearance of the predetermined graphical representation, the event comprises messages that specify a data object of the portal content and an action associated with the data object, and
in response to the user selecting the predetermined graphical representation in the status indicator arrangement, trigger an action related to portal content corresponding to the predetermined graphical representation.

16. The product of claim 15, wherein the product further comprises instructions to:
determine a state of the one or more applications and the portal settings.

17. The product of claim 16, further comprising instructions to:
select the changed appearance of the predetermined graphical representation from a plurality of graphical representations, each of the plurality of graphical representations being associated with a respective state of the one or more applications and the portal settings; and
display the changed appearance of the predetermined graphical representation.

18. The product of claim 17, further comprising instructions to:
monitor the one or more applications and the portal settings for a change of state;

replace the predetermined graphical representation with an updated graphical representation associated with a detected change of state; and iteratively monitor and replace, as required, the predetermined graphical representation with the updated graphical representation.

19. The product of claim 15, wherein changing the appearance of the predetermined graphical representation further comprises:

outputting one of pop-up text, mouse-over text, and sound.

20. The product of claim 19, wherein:

providing a status indicator arrangement includes displaying a status bar.

21. The product of claim 20, wherein displaying a status bar comprises providing graphical representations to the portal desktop, the graphical representations comprising one of an icon, text, pop-up text, and sound.

22. The product of claim 15, wherein:

monitoring the one or more states comprises monitoring applications distributed over a network.

23. The product of claim 15, wherein the identified portal content comprises one of email, calendar functions, alerts, project development systems, and news.

24. The product of claim 15, further comprising instructions to:

identify additional elements of portal content to which the user has subscribed;

monitor statuses of the additional elements; and provide additional graphical representations to indicate the statuses of the additional elements, the additional graphical representations being included as portal content.

25. The product of claim 15, wherein the one or more applications and the portal settings comprise a first element of portal content, the product further comprising instructions to:

identify a second element of portal content based on a role of the user;

monitor a status of the second element of portal content; and provide a second, different graphical representation to indicate the status of the second element of portal content, the second graphical representation being included as portal content.

26. A system for providing status of portal content in a portal session, comprising: one or more processors configured to:

identify the portal content, the portal content comprising:
one or more applications to which a user is subscribed, and
portal settings, the portal settings comprising features that pertain to unsubscribable elements of the portal session that are related to a configuration of the portal session;

monitor one or more states of the one or more applications and the portal settings;

provide, to a client device, access to a portal desktop for presenting the portal content including the one or more applications and the portal settings;

provide a status indicator arrangement in the portal desktop, wherein a first portion of the status indicator arrangement represents the one or more states of the one or more applications and a second portion of the status indicator arrangement represents states of the portal settings;

notify the user of a change in a state of the one or more states of the one or more applications and the portal settings using the status indicator arrangement, wherein the notifying the user of the change in the one or more states of the one or more applications comprises notifying the user even if the one or more applications are not being displayed to the user, wherein the status indicator arrangement comprises graphical representations corresponding to the one or more applications and the portal settings, and wherein initial states of the graphical representations are referenced to states of the graphical representations in a previous portal session, wherein notifying comprises changing an appearance of a predetermined graphical representation to indicate an occurrence of an event in the portal content corresponding to the predetermined graphical representation, wherein changing the appearance of the predetermined graphical representation occurs in accordance with user input, the user input specifying the changed appearance of the predetermined graphical representation, the event comprises messages that specify a data object of the portal content and an action associated with the data object, and in response to the user selecting the predetermined graphical representation in the status indicator arrangement, triggering an action related to portal content corresponding to the predetermined graphical representation.

27. The system of claim 26, further comprising:

a network in communication with the one or more processors and the client device, wherein the one or more applications comprise a plurality of applications distributed over the network, and wherein monitoring a state includes monitoring the plurality of applications.

28. The system of claim 26, wherein the one or more processors are further configured to:

select the predetermined graphical representation from a plurality of graphical representations, each of the plurality of graphical representations being associated with a respective state of the one or more applications and the portal settings.

29. The system of claim 28, wherein the one or more processors are further configured to:

replace the predetermined graphical representation with an updated graphical representation associated with a detected change of state; and iteratively monitor and replace, as required, the predetermined graphical representation with the updated graphical representation.

30. The system of claim 26, wherein the predetermined graphical representation comprises one of an icon, text, and pop-up text.

* * * * *